Figure 1:
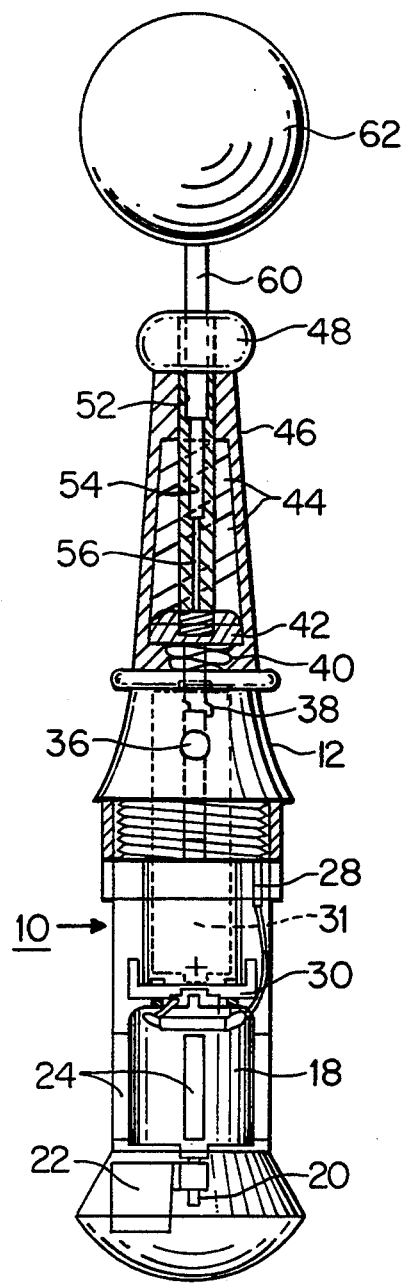

United States Patent [19]
Coleman

[11] Patent Number: 5,391,107
[45] Date of Patent: Feb. 21, 1995

[54] DEVICE FOR MAKING A CANDY SUCKER JIGGLE

[75] Inventor: Thomas J. Coleman, Bristol, Va.
[73] Assignee: B.A.A.T Enterprises Inc., Bristol, Va.
[21] Appl. No.: 122,680
[22] Filed: Sep. 17, 1993
[51] Int. Cl.⁶ ............................................. A63H 33/26
[52] U.S. Cl. ...................................... 446/484; 446/71
[58] Field of Search .................. 446/484, 71; 401/195, 401/34, 88, 207; 132/73.6; 601/70, 72; 426/134; 30/164.9; 81/177.85, 185, DIG. 11

[56] References Cited
U.S. PATENT DOCUMENTS

| | | | |
|---|---|---|---|
| 1,618,715 | 2/1927 | Lammers et al. | 81/185 |
| 3,183,538 | 5/1965 | Hubner | 132/73.6 UX |
| 4,713,039 | 12/1987 | Wong | 446/484 X |
| 5,244,299 | 9/1993 | Chu | 401/195 |

Primary Examiner—Mickey Yu

[57] ABSTRACT

This invention sets forth a two part housing with a motor in a lower part. The motor has a downwardly extending shaft to which an offset weight is secured. The upper housing includes an axially directed aperture of different diameters with the largest diameter portion at an upper end to receive a stick of a candy sucker. The candy sucker is vibrated or jiggles when the motor is operated so that during consumption of the candy sucker the candy sucker jiggles in the users mouth.

3 Claims, 1 Drawing Sheet

U.S. Patent	Feb. 21, 1995	5,391,107

DEVICE FOR MAKING A CANDY SUCKER JIGGLE

This invention is directed to a device for making a candy sucker jiggle and more particularly to a jiggle device to which a candy pop on a stick, a gummy type candy on a stick or an amusing device on a stick can be secured.

Heretofore vibration motors have been used for amusing toys such as set forth by U.S. Pat. No. 4,219,957 which is constructed as a traveling toy which will move across a smooth surface. Another such device has been set forth in U.S. Pat. No. 5,152,708 which is provided with an attitude switch which is off in one position (vertical) and which is on in another position (horizontal). Still another device has been set forth in U.S. Pat. No. 3,530,617 which is provided with two accentrically mounted weights with one on opposite ends of a shaft of a motor for symmetry. As the shaft of the motor rotates a vibration is set up which causes a toy vehicle to be driven in any direction.

Each of these patents illustrate a motor with means for setting up a vibration as the motor operates.

It is therefore an object of the invention to provide a novelty holding device designed to jiggle or shake a piece of candy on a stick while being consumed or for vibration of any other object on stick.

Another object is to provide a candy holding device which can receive different sized sticks which are held in place in order to shake the candy.

Yet another object is to provide a simple device which can be used by any person of most any age to jiggle a piece of candy or some other object secured to a stick.

While another object is to provde a toy which is inexpensive and can be used many times as a electrically operated device to which a battery can be replaced once the battery has been discharged.

Figure 2:
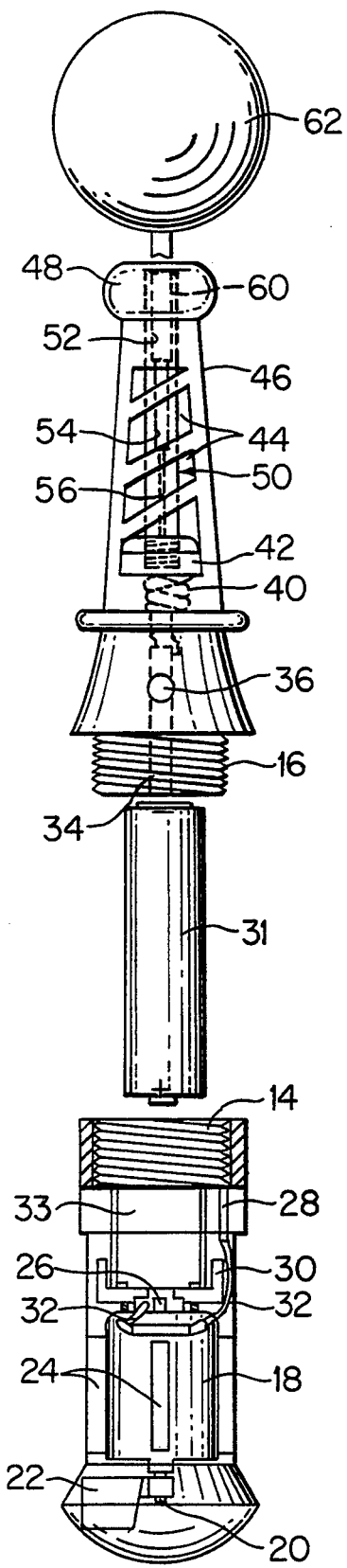

Other objects and advantages will become obvious and better understood from the following description of the drawings wherein:

FIG. 1 illustrates in a partial cross sectional view the cooperative elements of the device; and FIG. 2 illustrates a broken-down view illustrating the various parts.

As shown, the device includes a two piece housing 10 and 12 which is secured together by adjoining female and male treaded ends 14 and 16. The housing part 10 includes a minature motor 18 which is provided with a driven shaft 20 on which an off-centered weight 22 is secured for rotation therewith. The motor is supported with a motor mount 24 which is in contact with the outside surface of the motor and the inside surface of the housing.

The motor is provided with a positive center contact 26 and a radially spaced negative contact 28 in the form of an electrically conductive ring which is supported on an insulator spacer 30 which may be made of plastic and which has an axial aptitude for receiving one end of a battery 31. The negative contact ring 28 has an electrical wire or conductor 32 secured thereto which connects with the negative side of the motor. The negative ring 28 is positioned paralled with an axial axis of the housing at the lower end of the threads 14 so that a negative contact 34 of a spring switch 36 which has one end supported on an outer end of the threaded part 16 makes contact with the ring when the housing parts 10 and 12 are threaded together. The spring switch 36 is provided with a conductor 38 which is spaced from the adjacent end of the switch 36 so that when the switch 36 is pushed downwardly, an electrical contact will be made between the switch contact and the conductor 38. The conductor 38 is in electrical contact with a spring element 40 which is in contact with the negative end of the battery to complete the electrical circuit with the end of the battery and the motor.

When the housing ends 14 and 16 are threaded together the electrical conductor 34 makes contact with the conductor ring 28. If a battery is positioned within the space 33, the positive end of the battery contacts the positive connection 26 of the motor and the negative end of the battery connects electrically with the spring 40. The spring 40 is supported by an insulator holder 42 molded in the housing 12 so that a spring force is applied onto the battery when the battery is in place, and the housing ends are threaded together. An electrical circuit to the motor is completed by pressing down on the switch element 36 which makes an electrical contact with the conductor 38 to complete the electrical circuit with the battery and motor.

The housing 12 becomes smaller in diameter in a direction away from the end 16 to have a somewhat conical shape. In order to save expenses in making the device, the area between the spring holder and an upper end can be molded with spaces 44 in the conical section 46. The upper end of the conical section 46 is provided with a holder or stick receptacle which supports a stick 60 of a jiggle pop 62 in the upper end of the housing. The holder is provided with an outer end 48 that fits tight within the upper end of the conical section of the housing 46. The outer end 48 fits with a snug fit on the outer end of the conical housing 46 and is provided with an elongated body portion 50 which extends to and is supported by the holder 42. The elongated body has an axial aperture with different sized diameters 52-56 with the largest diameter size the outermost diameter. Thus, sticks of different sized diameter can be inserted into the outer end 48 and held in place within one of the different sized diameters of the holder 50. The outer surface of the outer end 48 is in contact with the outer end of the conical housing portion so that vibrations will be carried to the sucker stick via the motor mount, the housing, the holder 42 and the outer end 48. Instead of a sucker stick holder having different sized diameters the holder could have a split along its length for holding different sized sticks.

In operation, the switch is pressed in to make contact with the electrical contacts of the electrical circuit between the battery and motor. When the switch makes contact with the electrical contacts, the motor rotates. As the motor rotates, the off center weight 22 causes the motor to vibrate. As the motor vibrates the vibration passes from the motor to the housing and through the housing to the jiggle pop holder which causes the jiggle pop to vibrate. Any person can place the jiggle pop in their mouth and the jiggle pop will vibrate in the mouth for a fun type sucker.

Since the device vibrates any jiggle type noise maker or any other device such as a gummy device of different configurations can be attached to the jiggle pop stick for a vibration motion. Differently designed motion devices can be designed and used on the jiggle pop stick instead of a jiggle pop.

Since the inner diameter of the jiggle pop stick holder has three different sized diameters beginning with the largest diameter toward the outer end or an axial slit, different sized sticks can be used for the jiggle pop.

Since the housing comes apart, the battery can be removed and charged or can be charged when discharged. Also the jiggle pop stick is inserted into jiggle pop stick holder the object being vibrated can be changed by removing the jiggle pop stick and replacing the jiggle pop stick with another stick which includes a jiggle pop, a gummy device, a noise maker or any other device on one end of the stick.

I claim:

1. A device for making a candy sucker jiggle including a housing,
   said housing including an upper end and a lower end with said lower end separatable from said upper end,
   said lower end of said housing including an electric motor,
   a motor frame in contact with an inner surface of said lower end of said housing and in contact with an outer surface of said motor,
   a shaft extending axially downwardly from said motor and rotatable by said motor,
   an off centered weight secured to said shaft,
   a battery power supply for connection with said motor,
   switch means for completing an electrical circuit from said battery to said motor for activating said motor,
   said upper housing including an elongated candy sucker stick holder in contact with said upper end of said housing,
   said candy sucker stick holder including an enlarged outer end portion with an axial opening with fixed sections of different diameter in said upper end housing for receipt of one end of a candy sucker stick of a size to fit into one section of different diameter in which the outermost diameter section is of a largest diameter whereby activation of said motor causes a candy sucker on an outer end of said candy sucker stick to vibrate for insertion into a users mouth for consumption of said candy sucker.

2. A device for making a candy sucker jiggle as claimed in claim 1, wherein said switch means is spring loaded and biased to open said electrical circuit when in a normal position.

3. A device for making a candy sucker jiggle as claimed in claim 1, wherein said battery is held in place by said upper and lower ends of said housing when said upper end and lower end of said housing are assembled together.

* * * * *